United States Patent Office 3,462,160
Patented Aug. 19, 1969

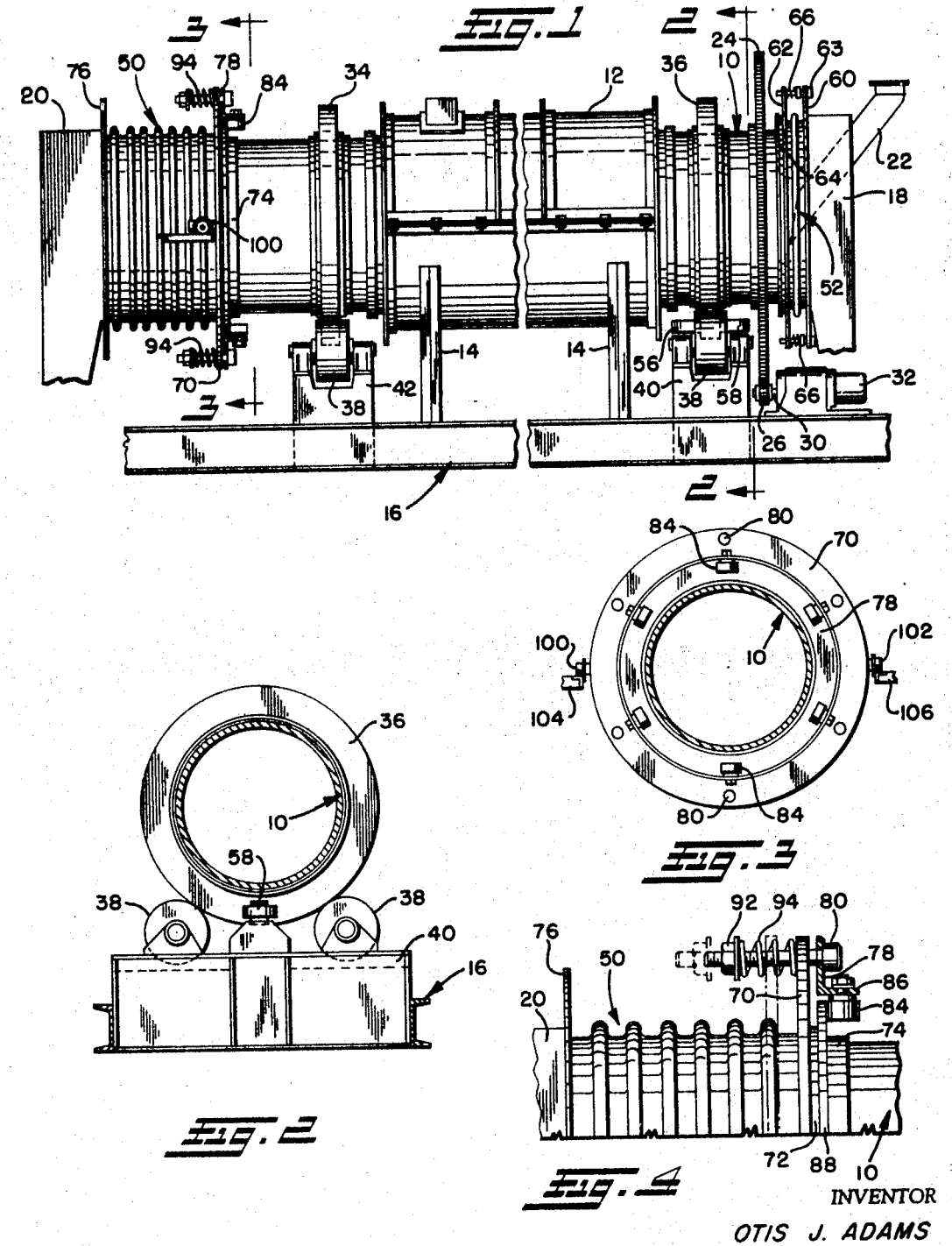

3,462,160
SEAL FOR ROTATING CYLINDER
Otis J. Adams, Chagrin Falls, Ohio, assignor to Bartlett-Snow, a division of Bangor Punta Operations, Inc., Bangor, Maine
Filed Nov. 15, 1966, Ser. No. 594,445
Int. Cl. F16j *15/36, 15/38*
U.S. Cl. 277—88    11 Claims

ABSTRACT OF THE DISCLOSURE

A seal for the end of a rotating cylinder which is subject to longitudinal expansion and contraction which includes a non-rotating bellows supporting a first annular seal with a second annular cooperating seal mounted on the cylinder, the two seals being clamped together by a spring assembly which is movable longitudinally with the end of the cylinder on expansion and contraction to maintain the pressure exerted by the assembly essentially constant.

---

This invention relates as indicated to a seal for a rotating cylinder, and more particularly to a seal having particularly advantageous use with rotary cylinders subject during operation thereof to relatively high temperatures inherently productive of longitudinal cylinder expansion.

In rotating cylinders of the type described, of which a continuous calciner is a typical example, the cylinder is subjected to temperatures often substantially in excess of 1,000° thereby resulting in longitudinal expansion of the cylinder. In fact, on cylinders of substantial length, the longitudinal expansion of the cylinder at the noted high temperatures of operation may approach as much as 5 inches.

In calcining operations at such elevated temperatures, it is frequently desirable to provide a particular atmosphere within the cylinder for accomplishing the desired heat treating of the material fed thereto. For example, it may be desired in certain instances to heat such material in an oxidizing, inert or reducing atmosphere to achieve the intended result. When a particular atmosphere is thus provided, it is essential that the ends of the cylinder be sealed to ensure that there is no leakage of the gases outwardly of the cylinder or, conversely, no entry of the room air into the interior of the vessel.

Present such sealing means are generally satisfactory where cylinder expansion is slight but do not provide satisfactory sealing where expansion approaches the above referred to amount. A common such form of seal comprises an expandible, non-rotating bellows which surrounds the cylinder in the end regions thereof, with one end of each of said bellows being resiliently urged by a plurality of springs or the like against an adjacent face of a sealing member carried by the rotating cylinder thereby to seal the adjacent end of the same. Although as noted this type of seal is normally satisfactory where cylinder expansion is relatively slight, where expansion is substantial the compression of the several springs is of such magnitude as to exert an undesirable compressive force on the rotary joint.

With the above in mind, a primary object of the present invention is to provide a seal for sealing a rotary joint wherein the sealing pressure remains essentially constant regardless of the degree of elongation of the cylinder.

A more specific object of the present invention is to provide a seal which includes a plurality of spaced compression springs, with each of such springs being carried by means movable in response to longitudinal expansion of the cylinder, whereby the compressive force of each of such springs remains relatively constant regardless of the elongation of the cylinder.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a partially fragmentary side elevational view of a rotating cylinder having associated therewith the seal in accordance with the present invention;

FIG. 2 is a transverse sectional view taken on line 2—2 of FIG. 1;

FIG. 3 is a sectional view taken on line 3—3 of FIG. 1; and

FIG. 4 is a fragmentary, enlarged view of a portion of FIG. 1.

Referring now in more detail to the drawings, wherein like parts have been indicated by like reference numerals, a rotating cylinder is generally indicated at 10, with the intermediate section thereof extending through a furnace 12 supported by cradle support members commonly designated at 14 on a base frame generally indicated at 16. The furnace 12 is of conventional construction, being preferably refractory lined and adapted to receive a suitable fuel for heating an annular space around the cylinder 10.

The ends of the cylinder 10 extend in either direction beyond the furnace 12 and are operatively connected in sealed relation by means to be presently described to feed end breeching assembly 18 and discharge end breeching assembly 20. The breeching assembly 18 is constructed and arranged to receive a sealed feed inlet 22 which in the form shown comprises a feedpipe but which may alternately comprise a screw feeder or other suitable, known feeding mechanism for delivering the material to the cylinder 10. In like manner, the discharge breeching assembly 20 is provided with a suitable discharge means (not shown) for receiving the treated material and directing the same to a suitable discharge point.

In the form shown, the cylinder 10 is provided with a gear ring 24 on the exterior thereof adapted to be driven by a drive gear 26 driven by the output shaft 30 of a motor reducer 32 supported on the frame 16. The cylinder 10 is supported for rotary movement by riding rings 34 and 36 mounted on the periphery of the cylinder, with each riding ring being supported for rotation by trunnion rolls commonly designated at 38, FIG. 2. The trunnion rolls 38 are in turn supported for rotation by front and rear trunnion stands 40 and 42, respectively, supported by the frame 16.

As above noted, the rotary cylinder 10 at the noted high operating temperatures expands longitudinally a substantial amount and means are required to be provided to accommodate such expansion relative to the fixed breeching assemblies 18 and 20. In the form shown, a discharge end bellows generally indicated at 50 is provided for such purpose in a manner to be hereinafter described. A feed end bellows generally indicated at 52 is also provided adjacent the feed end breeching 18, with the bellows 52 in the particular form shown being confined in function to providing a rotary seal at the juncture of the breeching and cylinder, as will be hereinafter described.

The apparatus thus far described is well known in the art and the operation of the apparatus well understood. Material fed to the rotary cylinder 10 through the sealed feed inlet 22 is heat treated within the cylinder and discharged from the discharge end of the apparatus. The temperature within the cylinder 10 is controlled by the furnace 12, and the type of atmosphere within the cylinder depends upon the particular material being treated and the end results desired.

At the indicated temperatures, the expansion of the rotary cylinder 10 is generally uniform along the length thereof. However, it is desirable to accommodate the entire expansion at the discharge end of the apparatus, and for this purpose a pair of thrust rollers 56 and 58 are provided carried by the trunnion stand 40, with the adjacent peripheral edges of the thrust rolls contacting the opposed sides of the riding ring 36 thereby serving to restrict the lateral movement thereof and thus the longitudinal movement of the cylinder 10 in such area.

As above indicated, the feed end bellows 52 functions primarily to provide a rotary seal at the confronting faces of the front end of the cylinder 10 and the fixed breeching assembly 18 for retaining the gaseous atmosphere within the cylinder 10 during operation of the apparatus. For such purpose, the outer end of the bellows 52 is provided with a ring 60 rigidly mounted on the fixed breeching 18. The inner end of the bellows carries a seal ring 62 which is adapted to engage and thus seal the leading face of an angle ring member 64 rigidly mounted on the cylinder 10 adjacent the feed end thereof. The seal ring 62 is adapted to resiliently engage and seal the face of the angle ring 64 by means of a plurality of circumferentially spaced compression springs commonly designated at 66 which are carried by rods 68 carried by the flange 60, with the several springs 66 serving to uniformly resiliently bias the seal ring 62 into the engagement with the front face of the angle ring 64 thereby to seal the rotary joint and prevent leakage therethrough. As well understood by those in the art, the relatively rotatable contacting surfaces of the seal ring 62 and angle ring 64 may be suitably lubricated for reducing the friction therebetween as well as improving the sealing of the rotary joint.

In the past, a rotary seal similar to the type just described has likewise been provided at the discharge end of the cylinder 10 for taking up the entire longitudinal expansion of the cylinder. As will be understood, in such arrangement the several compression springs and the bellows were compressed to a considerable degree, with the springs and the bellows when thus compressed exerting an undesirably high spring pressure on the rotary joint.

In accordance with the present invention, the spring pressure acting to seal the rotary joint at the discharge end of the rotating cylinder 10 is uniform and constant regardless of the expansion of the cylinder. The improved rotary seal, as best seen in FIG. 4, comprises an annular disc 70 secured to the inner end of the bellows 50 which surrounds the adjacent end of the cylinder 10. The disc 70 has mounted thereon a seal ring 72 which is adapted to sealingly engage the leading face of angle ring 74 mounted on the cylinder 10. The bellows 50 carries a disc 76 at the outer end thereof suitably affixed to the discharge end breeching 20.

An angle disc 78 of generally L-shaped cross-section is positioned outwardly of the disc 70, and bolts 80 extend through circumferentially spaced aligned openings formed in the respective members. The disc 78 carries a series of rollers commonly designated at 84 which extend radially inwardly from the leg 86 of the disc and engage the adjacent face of flange 88 of angle ring 74.

The bolts 80 are threaded to receive a flanger nut 92 the inner end of which receives the adjacent end convolution of a compression spring 94. The opposite end of the spring 94 seats on the outer face of the disc 70. It will thus be seen that the several springs 94 resiliently urge the disc 70 and seal ring 72 carried thereby into contact with the end face of the angle ring 74 thereby sealing the rotary joint.

A pair of side rollers 100 and 102 are carried by the disc 70 and extend radially outward therefrom for rolling engagement with supporting angles 104 and 106, respectively, suitably supported on the apparatus frame, with the rollers serving to stabilize and guide as well as support the longitudinal expansion and contraction of the bellows 50 and the structure operatively connected thereto.

The improved rotary seal operates as follows. When the cylinder is at room temperature and not expanded, the springs 94 function as described to bias the seal ring 72 into uniform resilient contact with the adjacent face of the angle ring 74, with the spring pressure being adjustably set by the flanged nuts 92. The bellows 50 at this time may be at its free length or partially expanded. When the cylinder 10 expands, the discharge end of the cylinder will expand toward the left, as viewed in FIG 1, with the expansion at the opposite end of the cylinder 10 being completely restricted by the thrust rolls 56 and 58 as above described. As the cylinder 10 expands toward the left, the angle ring 74 will move in such direction the disc 70 which will in turn act on the adjacent ends of the several compression springs 94 thereby to move the bolts 80, disc 78 and rollers 84 in the same direction of travel, with the rollers 84 remaining in contact with the flange 88. By movably mounting both ends of the springs 94, the spring pressure exerted thereby remains substantially constant regardless of the degree of expansion of the cylinder 10 thereby eliminating undesirable build-up of spring pressure as a result of substantial cylinder elongation. The only change in pressure at the rotary seal will be the pressure exerted by the compression of the bellows from its free length, if any.

The confronting faces of the seal ring 72 and angle ring 74 can be lubricated in any known manner. It will also be apparent that means other than rollers 84 could be provided in order to reduce the friction between the relatively rotatable flange 88 and the angle disc 78. Other minor changes will suggest themselves to those skilled in the art without, however, departing from the principles of the invention.

Other modes of applying the principle of the invention may be employed, change being made as regards the details described, provided the features stated in any of the following claims or the equivalent of such be employed.

I therefore particularly point out and distinctly claim as my invention:

1. A seal for sealing the rotary joint between a rotating cylinder and a rotatably fixed, longitudinally compressible bellows member comprising a first seal member carried by said bellows member, a second seal member mounted on the exterior of said cylinder adjacent said first seal member, spring means being free to move longitudinally with said cylinder for biasing said first seal member into resilient contact with said second seal member thereby to seal said rotary joint, and means for maintaining the pressure exerted by said spring means for sealing said rotary joint essentially constant regardless of the degree of longitudinal movement of said cylinder thereby to provide uniform sealing pressure on said rotary joint.

2. The combination of claim 1 wherein said first seal member comprises a seal ring carried by disc means mounted on the movable, inner end of said bellows member and extending radially outwardly thereof, said disc being adapted to receive means for supporting said spring means, said spring means resiliently urging said disc and said seal ring carried thereby into resilient contact with said second seal member.

3. The combination of claim 2 wherein said second seal member comprises an angle ring carried by said cylinder, said angle ring serving to longitudinally position said means for supporting said spring means.

4. The combination of claim 3 further including a generally L-shaped angle disc positioned radially outwardly of said angle ring, said angle disc having mounted thereon in circumferentially spaced relation a plurality of rollers engaging the inner face of said angle ring, said angle disc additionally supporting and retaining the adjacent ends of said spring means for supporting said spring means whereby the latter are movable longitudinally in response to longitudinal movement of said cylinder.

5. The combination of claim 1 wherein said spring means comprises a plurality of compression springs circumferentially spaced around said cylinder, means for supporting each of said springs comprising a threaded rod extending through said spring, a flanged nut threaded on said rod and serving to seat the adjacent end convolution of said spring, the opposite end convolution of said spring resiliently engaging means carrying said first seal member thereby to urge the latter into sealing engagement with said second seal member.

6. The combination of claim 5 wherein said means carrying said first seal member comprises a disc formed with a plurality of circumferentially spaced openings for receiving said threaded rods, said first seal member comprises a seal ring carried by said disc, and second seal member comprises an angle ring carried by said cylinder.

7. The combination of claim 6 further including angle disc means disposed radially outwardly of said angle ring, said angle disc mounting said threaded rods and serving to longitudinally position the same with respect to said angle ring, said rods thereby being movable with and in response to movement of said cylinder and said angle ring thereby to maintain a substantially constant spring pressure on said seal ring for sealing said rotary joint.

8. The combination of claim 7 further including roller means carried by said angle disc and engageable with the inner face of said angle ring, said rollers functioning to accommodate the relative rotative movement of said angle ring relative to said angle disc while simultaneously maintaining the angle disc in longitudinal alignment with said angle ring.

9. The combination of claim 1 further including means for supporting said bellows member for guided longitudinal movement comprising a pair of guide rollers operatively connected to said bellows at opposite sides thereof, said guide rollers being supported for rolling movement on horizontally disposed, fixed supporting means thereby to prevent rotation of said bellows member during expanding and contracting movement thereof in response to longitudinal expansion and contraction of said cylinder.

10. A seal for the end of a longitudinally expansible rotating cylinder comprising a non-rotating bellows, a first annular seal mounted on said bellows, a second annular seal mounted on said cylinder, and spring means operative to clamp said seals together, said spring means being free to move longitudinally with the end of said cylinder on longitudinal elongation and contraction thereof to maintain the spring pressure thereof essentially constant.

11. A seal as set forth in claim 1 wherein said second seal member rotates with respect to said spring means.

References Cited
UNITED STATES PATENTS 2,354,478    7/1944    Reinhardt et al. ____ 277—88 X
3,026,114    3/1962    Andresen et al. _____ 277—88 X LAVERNE D. GEIGER, Primary Examiner JEFFREY S. MEDNICK, Assistant Examiner